(12) United States Patent
Enyedi et al.

(10) Patent No.: US 9,509,557 B2
(45) Date of Patent: Nov. 29, 2016

(54) RECONNECTION IN A TRANSMISSION TREE

(71) Applicant: Telefonaktiebolaget L M Ericsson (publ), Stockholm (SE)

(72) Inventors: Gabor Sandor Enyedi, Budapest (HU); András Császár, Telki (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 76 days.

(21) Appl. No.: 14/352,341

(22) PCT Filed: Oct. 17, 2012

(86) PCT No.: PCT/EP2012/070600
§ 371 (c)(1),
(2) Date: Apr. 17, 2014

(87) PCT Pub. No.: WO2013/057158
PCT Pub. Date: Apr. 25, 2013

(65) Prior Publication Data
US 2014/0254350 A1    Sep. 11, 2014

Related U.S. Application Data

(60) Provisional application No. 61/547,905, filed on Oct. 17, 2011.

(51) Int. Cl.
*H04L 12/24* (2006.01)
*H04L 12/703* (2013.01)
(Continued)

(52) U.S. Cl.
CPC ....... *H04L 41/0668* (2013.01); *H04L 12/1854* (2013.01); *H04L 12/1868* (2013.01); *H04L 43/0811* (2013.01); *H04L 45/22* (2013.01); *H04L 45/28* (2013.01)

(58) Field of Classification Search
CPC .......................... H04L 45/22; H04L 43/0811
See application file for complete search history.

(56) References Cited

U.S. PATENT DOCUMENTS

| 2003/0179700 A1* | 9/2003 | Saleh | H04J 14/0295 370/216 |
| 2009/0142056 A1* | 6/2009 | Bernstein | H04J 14/0227 398/49 |

(Continued)

OTHER PUBLICATIONS

Fei, Aiguo et al., "A "Dual-Tree" Scheme for Fault-Tolerant Multicast", IEEE International Conference on Communications. Helinsky, Finland. Jun. 11, 2001, 690-694.*

(Continued)

*Primary Examiner* — Siming Liu
(74) *Attorney, Agent, or Firm* — Patent Portfolio Builders, PLLC

(57) ABSTRACT

The invention refers to operating a first node of a communication network comprising a plurality of nodes which are interconnected by communication links and wherein data traffic is provided over the communication links to provide a data stream to the nodes, wherein the first node (15) performs the steps of: detecting a data traffic interruption with respect to a second node (16), determining, if the data traffic is still received, and forwarding the data traffic to the second node (16) if the first node (15) receives the data traffic, and otherwise notifying a third node (17) of the plurality of network nodes about the data traffic interruption. The invention further refers to a corresponding node, a network and a computer program to be run in the node.

16 Claims, 5 Drawing Sheets

(51) Int. Cl.
*H04L 12/707* (2013.01)
*H04L 12/18* (2006.01)
*H04L 12/26* (2006.01)

(56) References Cited

U.S. PATENT DOCUMENTS

| | | | | |
|---|---|---|---|---|
| 2009/0161594 A1* | 6/2009 | Zhu | ............ | H04L 12/18 370/312 |
| 2010/0251037 A1* | 9/2010 | Cao | ............ | H04L 41/06 714/57 |
| 2012/0075988 A1* | 3/2012 | Lu | ............ | H04L 45/02 370/218 |

OTHER PUBLICATIONS

Doverspike, Robert et al., "IP Backbone Design for Multimedia Distribution: Architecture and Performance", 26th IEEE International Conference on Computer Communications, 2007, 1523-1531.

Karan, A. et al., "Multicast only Fast Re-Route", IETF Trust. Network Working Group, Mar. 13, 2011, 1-15.

Papadimitriou, Dimitri et al., "IP Multicast Fast Reroute Framework", Internet Engineering Task Force Trust. Network Working Group., Feb. 18, 2008, 1-9.

Wang, Junling et al., "IP Fast Reroute with Failure Inferencing", Internet Network Management '07, Kyoto, Japan, Aug. 27-31, 2007, 1-6.

Xiaonan, Wang et al., "FIMFS: Failure Inferencing based IP Multicast Fast Self-healing approach", International Conference on Computational Intelligence and Security. IEEE, 2009, 436-440.

Zhong, Zifei et al., "Failure Inferencing based Fast Rerouting for Handling Transient Link and Node Failures", INFOCOM 2005. 24th Annual Joint Conference of the IEEE Computer and Communications Societies. Proceedings IEEE vol. 4, Mar. 13-17, 2005, 2859-2863.

Office action in EP application No. 12783548.6 mailed Apr. 21, 2015, pp. 5.

* cited by examiner

RECONNECTION IN A TRANSMISSION TREE

TECHNICAL FIELD

The present invention generally relates to media streaming, and especially to unicast or multicast streaming and further especially to handling reconnections in a transmission tree.

BACKGROUND

Data streaming, e.g. unicast or multicast streaming might be performed from any source to a plurality of communication nodes that are interconnected tree-like so that every node is coupled, either via a direct interconnection or via interconnection involving one or a plurality of intermediate nodes, to the source. One problem is to handle faults within the tree; e.g. a link failure or a node failure.

In the following some examples are described about building and rebuilding communications trees:

Protocol Independent Multicast Sparse Mode (PIM-SM) is a well known and commonly applied protocol for building up and maintaining multicast trees in IP networks. This solution uses a single tree for forwarding packets to routers with hosts (destinations in the sequel) wanting to receive the content. PIM-SM is called "protocol independent" because it can use route information that any routing protocol enters into the multicast Routing Information Base.

When a router wants to join or leave a multicast group, it can do it using PIM-SM using simple unicast forwarding. When a node wants to join to a multicast tree using PIM-SM, it sends a JOIN message back towards the source (or towards the rendezvous point for shared tree; in the sequel we will not distinguish between these two anymore) More precisely, the last hop router of the destination may send some JOIN messages to the source (source-based tree) or to the rendezvous point (shared tree). The JOIN packet is routed along a path determined by Multicast RIB (MRIB). The routes in a corresponding table are, in practice, taken directly from the unicast routing table, but they could be different and provided by a separate routing protocol. The MRIB is used to determine the next-hop neighbor to which any PIM Join/Prune message is sent. JOIN is routed and processed hop-by-hop until a node already receiving the traffic is reached. All routers along this path process the JOIN message and install/update multicast routing state (e.g. adding the incoming interface to the outgoing interface list). Data flows along the reverse path of the JOIN messages. (It is to be noted that due to the MRIB being built by unicast routing protocols in practice, PIM JOIN packets are forwarded along the shortest path to the rendezvous point or to the source, which may differ from the shortest downstream path in the case of asymmetric link costs. As a consequence, multicast streams established with PIM potentially use suboptimal paths downstream (e.g. reverse shortest paths). Later, multicast packets will be forwarded along this path. Similarly, a destination wanting to leave the group sends a PRUNE packet up the tree. More detailed information about PIM SM can be drawn e.g. from the IETF document RFC46011.

In Multiprotocol Label switching (MPLS) networks, a multicast distribution tree is built up by means of the Multicast Label Distribution Protocol (MLDP). This might be performed by using a MLDP Label Map message sent from the egress points of the tree towards the root of the tree (the root in the MPLS network). Conceptually, the effect of the MLDP Label Map message is similar to the PIM Join message as discussed above. The MLDP Label Map message also goes upstream and immediately installs the MPLS labels to be used downstream.

PIM-SM depends on unicast routing such that if the routing fails, it must wait for the unicast routing to recover, thus making the convergence relatively slow. Since PIM-SM is commonly for building up paths for real-time traffic (e.g. for IPTV), this slow convergence can be a serious drawback. The same is true for MLDP.

Solutions for fast rerouting exist. E.g. a solution called SmartEdge proposed by Ericsson uses a so-called "dual join" to create a secondary connection for an incoming multicast stream to provide an immediate alternative in a case that the node lose its connection with its primary upstream neighbor. However, dual join cannot guarantee that each of the failures can be handled. Moreover, dual join is a "1+1" protection technique, which means that the alternate traffic is always present, even in a failure free situation, so this solution easily causes significant extra load in the network, especially with respect to high bandwidth traffic, e.g. HD IPTV streams.

SUMMARY

It is an object to overcome at least some of the problems discussed above. According to embodiments, it is on object to provide a reconnecting capability for a reconnection after a failure. It is desired to obtain a solution with good or full failure coverage and a fast failure detection (e.g. below 50 milliseconds) in an automated way.

According to an embodiment, a plurality of nodes (in the following also being referred to as communication or network nodes) of a communication network are connected to form a distribution tree such that data traffic is forwarded from a first node (e.g. a source node) to each of the plurality of further nodes.

If a first node detects a data traffic interruption with respect to second node e.g. by receiving a failure notification from the second node or by detection a connection loss to that node, the node determines if the data traffic is still received at this node e.g. if it is not an ancestor node with respect to the traffic flow). If yes, the first node forwards the data traffic to the second node; otherwise it notifies a thirds node about the connection failure.

If the third node is receiving the data traffic (over another tree branch), it forwards the data traffic to the first node e.g. by unblocking or activating an interconnection normally blocked or inactivated. If (e.g. as a consequence of the failure) the third node also does not receive the data traffic (e.g. if the third node is situated on the same tree branch), the third node notifies a fourth node, e.g. by forwarding the received message to the fourth node. The above procedure might be repeated in the fourth node and further nodes, until a last notified node is a node still receiving the data traffic. Data traffic might be forwarded backwards to every node in the chain of notifying nodes.

In an embodiment, the nodes of a distribution tree keeps stored each an alternative node to which it can connect for receiving the traffic in the case of a failure with effect to the main connection.

In an embodiment, the recipient (the alternate node) of an failure notification (e.g. an activation packet) is actually receiving the stream from a node that sent the notification; the recipient forwards the activation request further to its own alternate. Otherwise the node starts forwarding the data packets towards the requesting node.

It might be noted that one or a plurality of further nodes might be outside the distribution tree adapted to forward notification packets.

The present invention also concerns computer programs comprising portions of software codes in order to implement the method as described above when operated by a respective processing unit of a user device and a recipient device. The computer program can be stored on a computer readable medium. The computer-readable medium can be a permanent or rewritable memory within one of the nodes or located externally. The respective computer program can be also transferred to the nodes for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
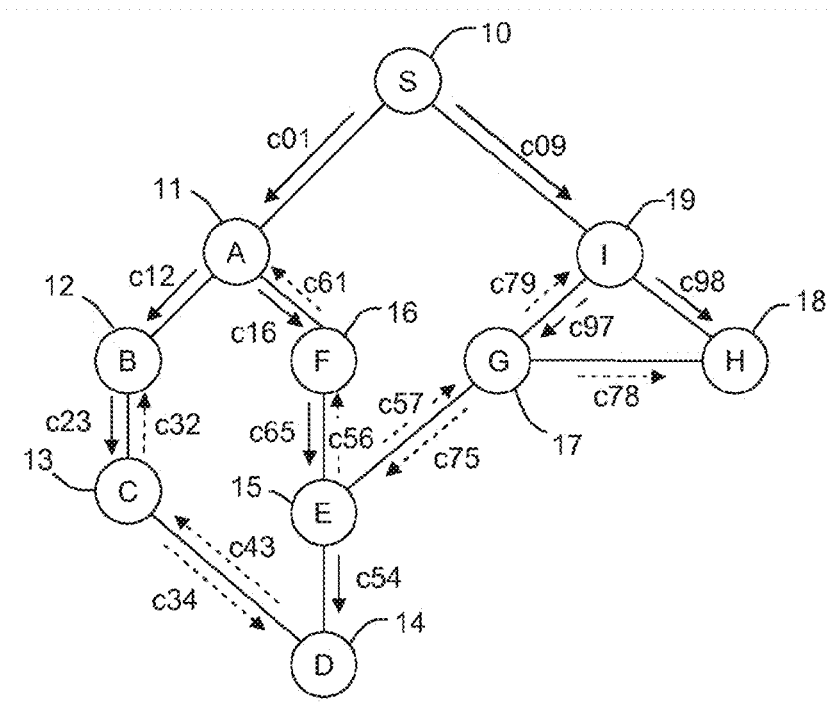
FIG. 1 shows an illustrative example for a multicast data distribution tree comprising a main distribution tree and a plurality of protection alternative connections forming a protection forest.

According to FIG. 1, a source node 11 and a plurality of (communication) nodes 11-19 are interconnected to form a data distribution tree such that each of the plurality of nodes 11-19 receives data either directly from the source node 10 or indirectly over one or a plurality of interconnected nodes. Thereto, each of the recipient nodes 11 -19 has one main (or initially activated) link or connection (drafted as solid arcs) c01, c09, c12, c13, c23, c65, c54, c97, and c98 to an ancestor node in order to receive the data.

Further, a plurality of alternate (or initially non-activated) links or connections c32, c34, c43, c56, c61, c57, c75, c79, c97, and c78 (drafted as dotted arcs) between each a pair of nodes are provided. The main connections are forming a distribution tree that might be regarded as primary tree, and the alternate connections might be regarded to forming a protection forest.

The alternate connections might be selected in such a way, that when a failure occurs at any point of the network, it is always possible to patch the original tree by using some of the alternate connections. If it is e.g. supposed that a certain connection (e.g. first connection c01) between first (recipient) node 11 and the source node 10 goes down, first node 11, after loosing its connection, tries to rejoin to its alternate, i.e. to sixth node 16 in this example. However, as this node received the traffic from the first node 11, it needs to use its alternate as well, so it reconnects to fifth node 15. Finally, this node reconnects to seventh node 17, which is the first node in the chain that is not an ancestor of the fifth node 15 or of the first node 11, so it is able to inject the traffic back to the lost component of the tree comprising the nodes 11, 12, 13, 14, 15 and 16.

Some applications may require small fail-over times. In these cases, reconnecting to the remaining part of the tree should be as fast as possible. Therefore, when a node detects the loss of connection, it sends out an activation packet immediately to its alternate.

Alternate connections can be thought of as inactive forwarding state: e.g. they are installed in the multicast FIB entries but are marked as blocked until an activation packet unblocks or activates them. The inactive forwarding states might have been, in this case, installed by prior tree-building mechanism, with an extension that these are now marked as inactive (blocked forwarding state).

If the recipient of an activation packet was actually receiving the multicast stream from node that sent the activation, the recipient is suspected to immediately forward the activation packet further to its own alternate (e.g. sixth node 16 receiving the indication must forward it to fifth node 15). Otherwise the node just needs to start forwarding multicast data packets towards the requesting node by unblocking the forwarding entry (e.g. after receiving an activation message, seventh node 17 starts sending data packets to fifth node 15, which in turn sends these packets also to sixth node 16 that forwards these packets to first node 11.

The approach described above may also be able to mitigate node failures. E.g. in a case that not a link, but an associated node fails (e.g. if not link c01 but node 11 itself goes down), one or a plurality of immediate affected nodes down in the tree (e.g. node 12 and node 16) will detect the loss of connection. These nodes will send out a failure notification each to their alternate node. Sixth node 16 will reconnect as previously. Additionally, now, second node 12 will reconnect as well to third node 13, so two trees are needed to patch this failure.

Figure 4A:
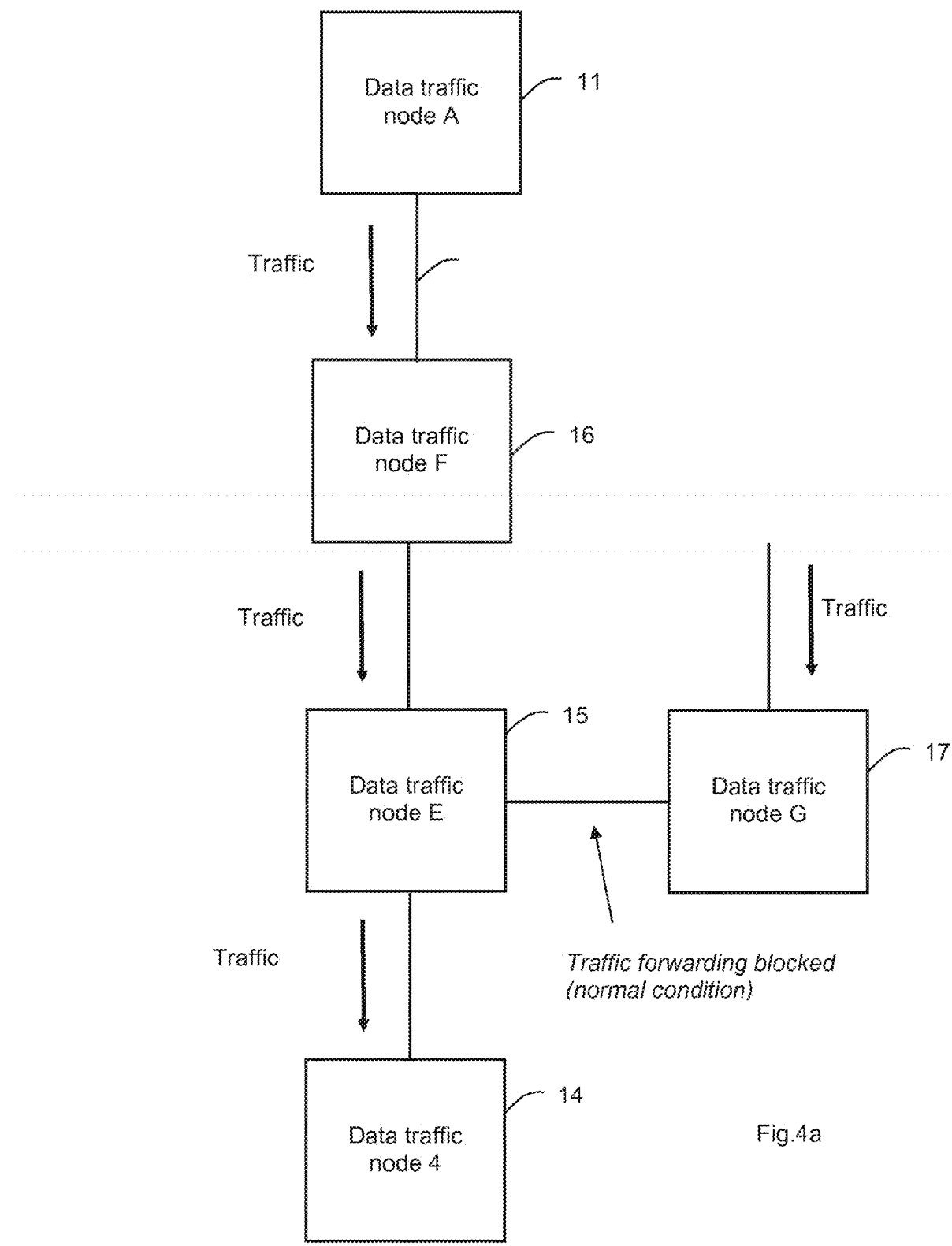
Figure 4B:
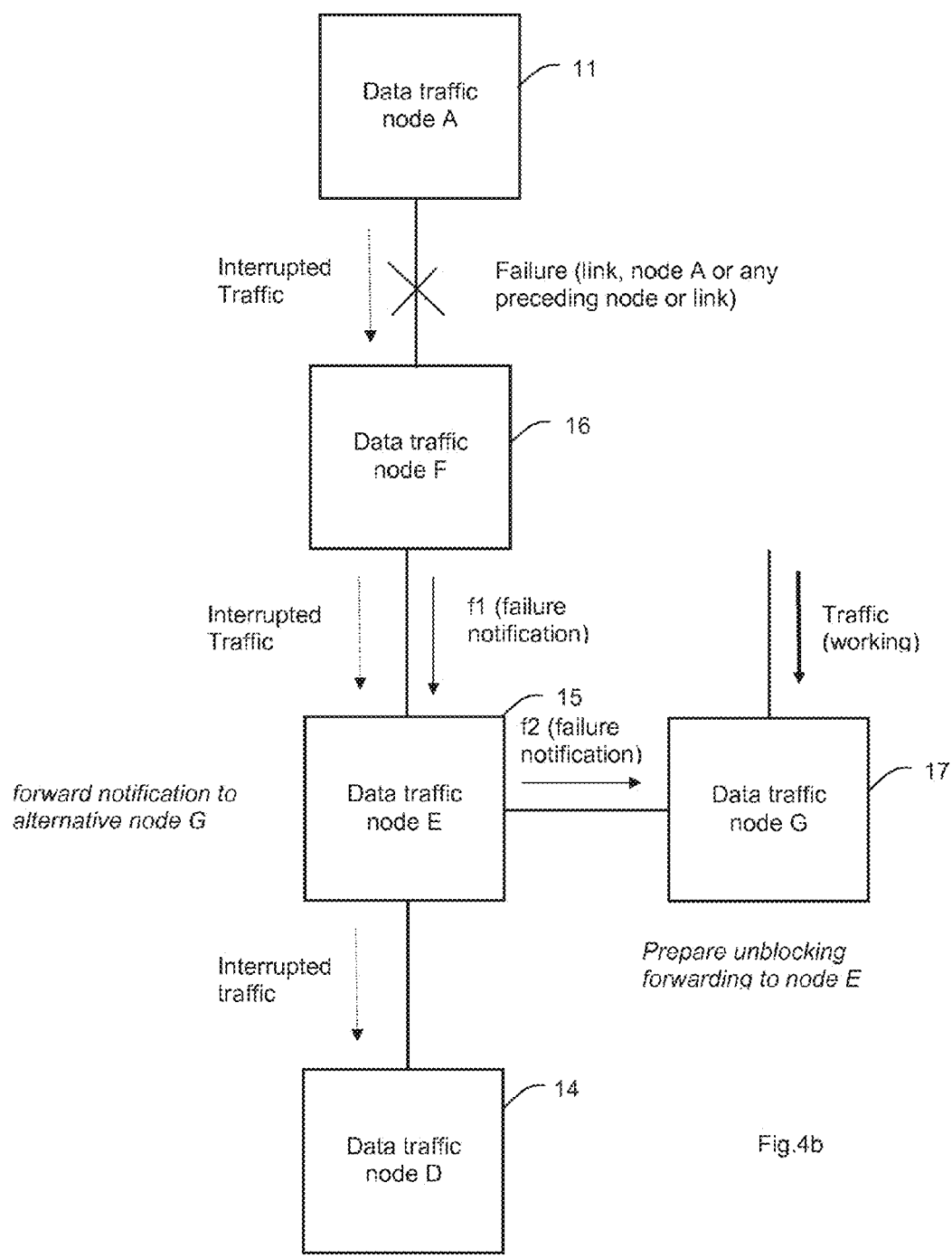
Figure 4C:
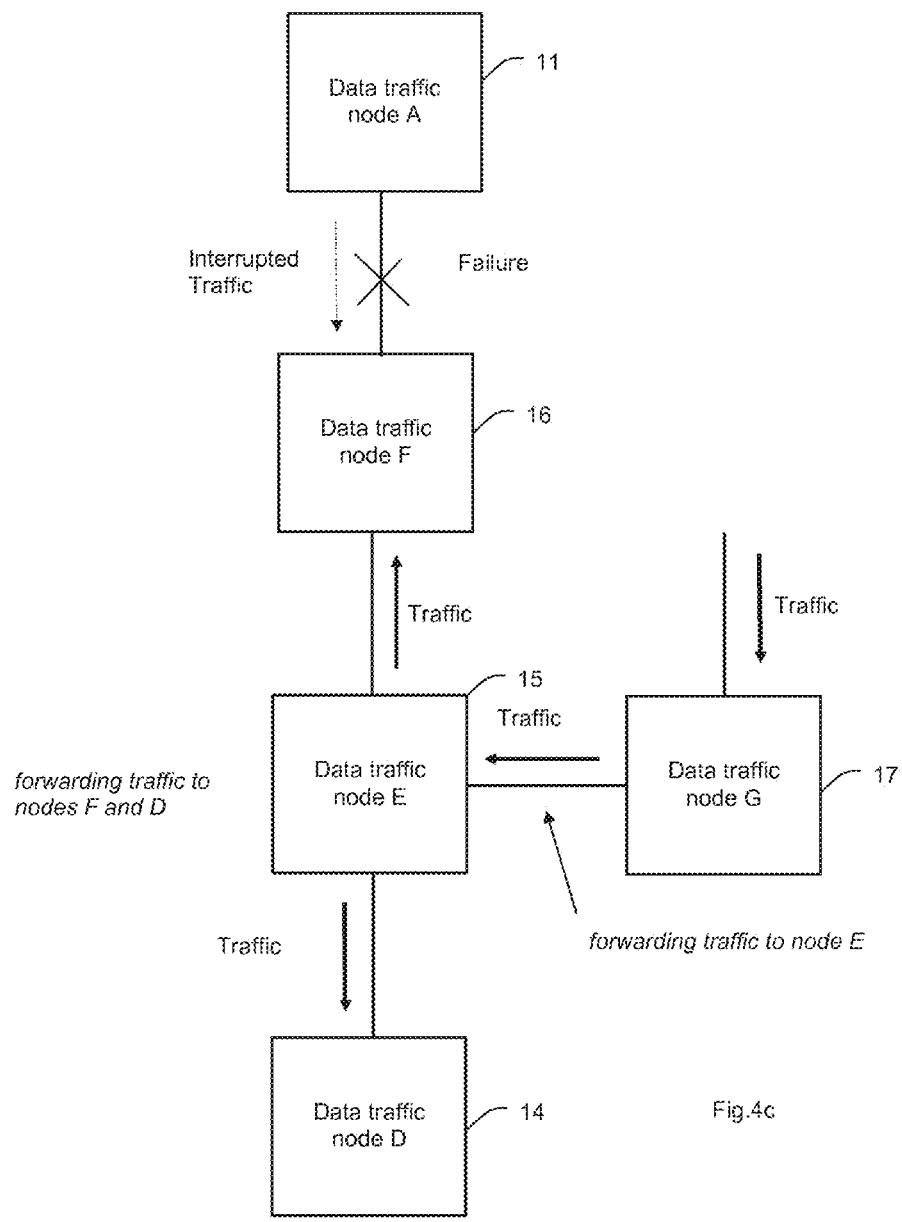

FIG. 4a-4c exemplarily illustrate a summary of the above-said. By way of example, a part of the distribution tree of FIG. 1 comprising nodes 11, 16, 14, 14 and 17 is shown. Node 11 is connected to node 16 over connection c16, node 16 is connected to node 15 over connection c65 and node 15 is connected to node 14 over connection c54. Further, node 17 is connected to another node not shown here. Further, nodes 15 and 17 are connected by means of connection c75. FIG. 4a shows a first state with activated connections c16, c65, c54, and non-activated connection c75 such that the data is distributed from node 11 to node 16, from this node to node 15, and from this node to node 14. Further the same data is sent to node 17 over a different path. FIG. 4b illustrates an exemplary failure at the link c16 between node 11 and node 16 resulting in that nodes 16, 15 and 14 will not receive the data anymore. However node 16 will detect the failure and will immediately send out a notification to its alternate node 16. Node 16 getting the notification will detect, that it is affected by the failure itself; thus it cannot cure the failure alone, but instead forwards the notification to its alternate node 17. As this node gets the data of the different path, it can cure the failure by unblocking the currently in-activated connection C75 and forwarding the data to node 15. Node 15 con now forward the date to connected nodes 14 and 16.

Figure 3:
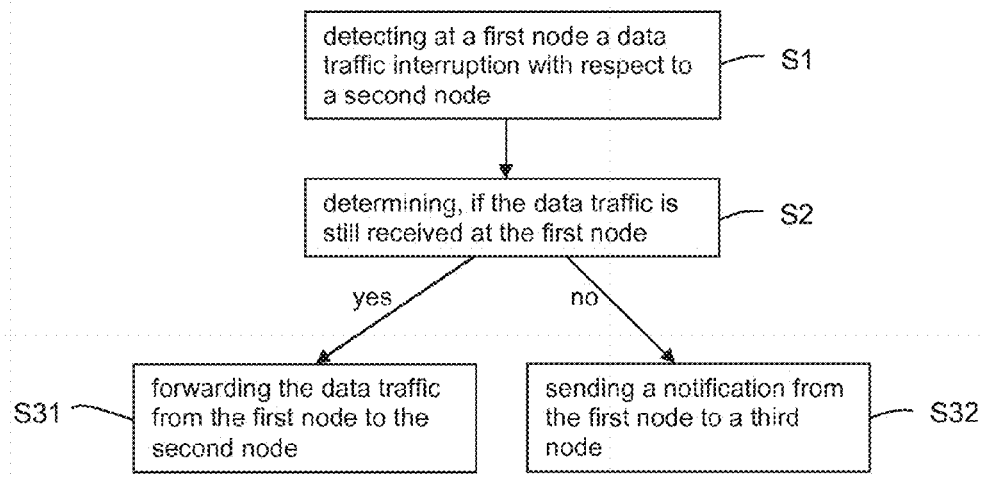
FIG. 3 shows an illustrative sequence of steps being performed in a network according to FIG. 1 or FIG. 2 after an occurrence of a transmission failure, and FIG. 4a, b, c each show an exemplary section out of the network of FIG. 1, and are illustrative of different stages for reconnection over a alternate link at a failure of a main link.

According to the above figures, FIG. 3 illustrates a basic sequence of steps S1, S2, S31, and S32:

In a first step S1 a first node, e.g. node 16, 15 or 17, detects a data traffic interruption with respect to second node e.g. nodes 11, 16 or 15.

In a second step S2, this node detects if the data traffic is still received at the first node (i.e. if it is not an ancestor node with respect to the traffic flow).

If yes, in first alternative step S31 the first node forwards the data traffic to the second node; otherwise in a second alternative step S32, it notifies a thirds node about the connection failure, wherein the thirds node might repeat the previous steps.

In an example, the network is a packet switched network, where multicast is realized by virtual circuit switched paths.

In an embodiment, each node might know the complete topology (e.g. application of a link state routing protocol in the network), and the multicast trees are built up by reverse shortest paths.

In an alternative embodiment, the nodes do not necessarily know the exact multicast tree, i.e. they do not necessarily know which nodes are in the group (if there are multiple shortest paths, it might be impossible to predict, which one will be selected). In the sequel, we will suppose that packets are forwarded from the source to the destination, which is a correct assumption for the source based tree mode of PIM-SM (for the shared tree of PIM-SM, the term "source" is the rendezvous point in the sequel).

First, a work tree is built up that is the "primary" tree. Further, each node computes an alternate parent, which is either one of its children in the multicast tree or one of its neighbors, which is neither a successor nor an ancestor (here an ancestor is a node closer to the root along the multicast tree). Alternates might be pre-computed, so when a failure occurs, the detecting node immediately sends out an activation packet, which enables its alternate to send the multicast traffic to that node.

In an embodiment, a multicast tree to forward packets is built by PIM (by way of example, the direction from the root to the destinations along the tree is referred to as down direction, and the opposite direction is referred to as up direction). If there is a failure splitting the forwarding tree into multiple components, tree parts need to be patched somehow and the lost component(s) are to be reconnected back to the remaining tree. In exemplary embodiments of the invention a mechanism is described, which can realize this reconnecting capability rapidly after a failure.

Reconnecting to the remaining part of the tree may happen with regular tree building mechanisms, like PIM Join or its equivalent in mLDP (Label Map message). The fail-over time is limited by the performance how nodes process the regular tree-building packets, which is typically done in the control plane.

The above-described technique is applicable to a broad range of telecommunication networks, e.g. where (virtual) circuit switched multicast paths are applied, such as in IPv4 and v6 (e.g. using PIM) and MPLS networks (e.g. using MLDP or RSVP-TE).

Figure 2:
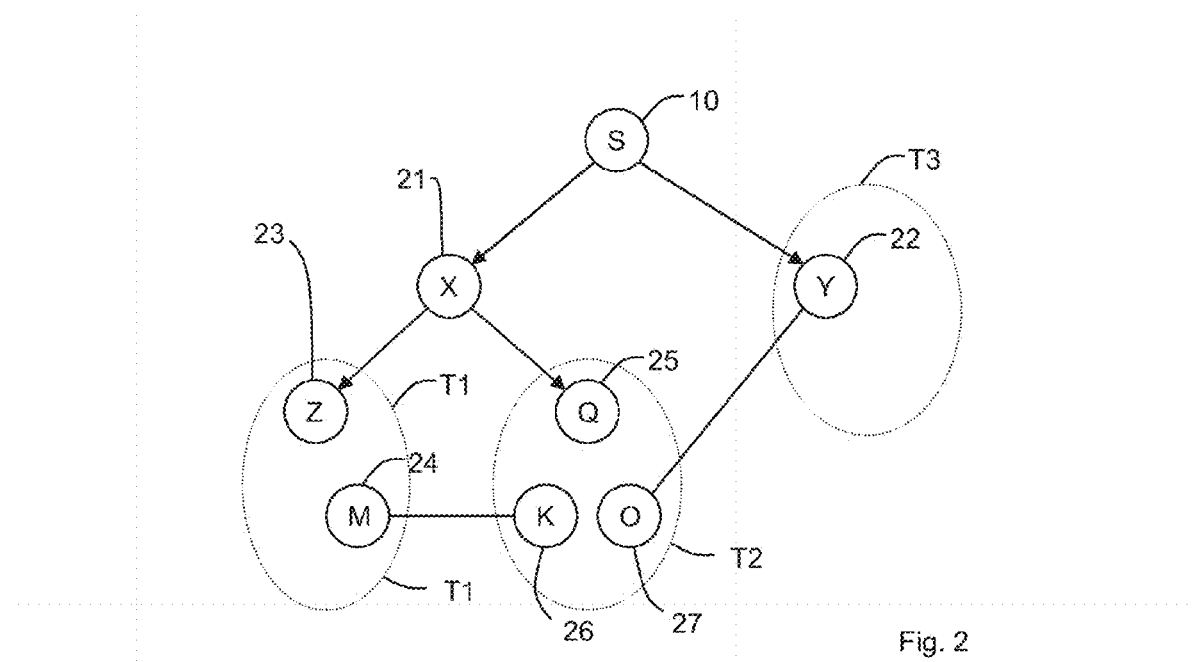
FIG. 2 shows an example for a node failure problem.

FIG. 2 describes an example, wherein as a result of a single failure, the network is split into not only two, but more components. FIG. 3 exemplarily shows source node 10 and a plurality of receiving codes 21, 22, 23, 24, 25, 26 and 27. By way of example, a failure of node 21 splits the network into three components T1 by way of example comprising two nodes 23 and 24, T2 by way of example comprising three nodes 25, 26, and 27 and T3 by way of example comprising node 22. The first component T1 rooted at node 23 needs to get to the one rooted at node 25 before getting out from the failed area rooted at node 21. By way of example, node 24 of the first component T1 has a non-activated connection to node 26 of the second component T2. Since the parent of node 24 cannot be node 26 at this point, so node 26 will not recognize the loss of connection when node 24 activates it as an alternate. However, this is a similar situation of the case as discussed under FIG. 1, when node 11 was failing. Since the second component T2 is rooted at node 25, this note after detecting the failure will restore the connection for node 26.

In the case when not all the nodes are inside the multicast tree, those inside the tree may compute the alternates in the same way as previously. This however means that some of them will choose a node as an alternate, which is not in the original multicast tree. Naturally, such a node cannot send the traffic immediately when an activation packet is received.

Therefore, all the nodes not in the multicast tree but selected as an alternate should select two alternates as well. The primary among these alternates by way of example is the neighbour, which would be parent, if the node was in the multicast tree. The secondary alternate is the neighbour, which would be the alternate, if the node was in the multicast tree. All the nodes need to join to both alternates as described previously, which means that both of these neighbours will do two alternate joins as well, if they are not in the multicast tree.

When a node not being in the multicast tree receives an activation packet, it needs to select one of its alternates, and forward the activation packet to that neighbour. By way of example this neighbor is always the primary alternate, except it is not available (the node needs to detect the failure of its primary alternate, (e.g. by means of bidirectional forwarding protection, as e.g. described in a document of D. Katz, and D. Ward, titled "Bidirectional forwarding detection", IETF RFC5880, June 2010) or if the sender of the activation packet is the primary alternate itself. In those two cases activation packet must be forwarded to the secondary alternate.

This way rejoining is exemplarily done in the same way as in the case when all the nodes were inside the multicast tree. If it is possible, nodes outside the tree will build up the branch of the tree containing them. Otherwise, they build up their alternate path leading out from their failing component.

It might be noted that a node can be in multiple multicast groups simultaneously, which means that for this case, keeping up one (or two if the node is not in the multicast tree) alternate per protected multicast groups is needed.

In the following a rerouting after a failure occurrence is exemplarily described: Without limitation, it might be supposed here that the multicast tree has already been built up by PIM-SM or some other protocol.

When a node having an alternate detects the failure of some of its multicast trees, its alternate path should be immediately activated. Therefore, its alternate must be notified with an activation packet in order to start sending the multicast traffic immediately.

This activation message is preferably a simple packet, which can be processed at the data plane of the router (in order to reduce reaction time). The packet must describe which multicast tree went down either by using some special destination address, or storing this information in the packet. Moreover, it is possible that the same alternate is used for more than one multicast group. In that case the activation packet may contain all of these groups.

A node receiving the activation packet should immediately start forwarding multicast traffic to the sender of the packet. To realize this, one may implement multicast with some blocking possibility; when it is needed, we the forwarding plane can simply remove blocking. As discussed above, it is possible that the alternate uses its own alternate in order to restore traffic flow, either when the sender of the activation packet is the parent of the receiver or when the receiver is not in the multicast tree. In this case the activation packet must be forwarded towards the alternate of the receiver.

Previously, a situation with only a single failure was discussed, while protection techniques preferably do cover multiple related failures as well. One important situation to be handled is the so-called Shared Risk Link Group (SRLG) failure case. Protecting against SRLG failures is not simple, and protection forests may have problems with complicated SRLGs. However, important types of such failures are preferably covered.

First, "local SRLGs", which are the result of failure of the same linecard, are immediately protected thanks to the fact that protection forests try to avoid using common nodes when it is possible.

Moreover, SRLGs resulted by some LANs in the network can be protected in a similar way; such LANs should be presented with some virtual nodes in the graph of the network, and we need to avoid them, as they were ordinary routers.

In the following, mechanisms for joining and leaving the multicast group are described in more details. Some details of the way of building up were already discussed. In this section we describe details of keeping up protection forests.

A node wanting to join, leave or upkeep a multicast group supported by protection forest needs to do exactly the same tasks as currently (e.g. needs to periodically send out some JOIN packets for PIM). Moreover, now each node has some alternate for each of the multicast groups to which it has joined. Since alternates need to prepare to send out the traffic to some of their interfaces immediately, when some activation packet is received, an alternate needs to know that it has been selected. Therefore alternate selection can be realized with some ALTERNATE JOIN messages.

Being an alternate might be a soft state (since no communication network is completely reliable), therefore such ALTERNATE JOIN messages is preferably sent out periodically in order to keep up this state. If such packet is not received for a certain period of time, this state is removed.

Finally, a mechanism might be needed to notify neighbors, when a node wants to leave a multicast group. In that case, the node can either simply stop sending ALTERNATE JOIN messages, or send out some special ALTERNATE PRUNE message to its previous alternate.

For multicast in MPLS networks mLDP can be used, which can be regarded as conceptually similar to PIM in IP. The mLDP Label Map message is similar to PIM Join message, i.e. goes upstream and installs the labels to be used by the data traffic downstream. So, for mLDP an "Alternate Label Map" message will be required, which can be a Label Map message with a flag set.

A failure detection mechanism between each nodes sending multicast traffic to each other can be realized e.g. by some hardware element (e.g. the loss of voltage can be detected) or by bidirectional forwarding detection (BFD) in the above-cited document IETF RFC5880.

When the failure has proven itself to be permanent, the protection forest should be reconfigured in order to prepare for another failure. In that case, nodes connected to their alternates should finish sending ALTERNATE JOIN messages and should join to their alternate as a parent. In this way the patched tree can be fixed. Later this tree can be optimized (this can be regarded as a responsibility of the protected multicast algorithm; e.g. PIM can rejoin to the best next hops using some JOIN packets).

Finally, when all the nodes are connected in this new tree, it is possible for each node to compute their new alternates.

It is to be noted that the above-described examples are focused to multicast by way of example. However, mutatis mutandis, they can be well applied to unicast.

Above-described embodiments are focusing on pre-building backup tree portions (e.g. by ALTERNATE JOIN messages); at failure occurrence, the tree portions only need to be activated by a simple activation packet. In technical language, fail-over solutions where only minimal tasks have to be done after a failure are often being referred to as "protection techniques".

As an advantage of above-described embodiments, reconfiguration with protection forest is much faster in the case of any single failure than in the case of normal PIM-SM or mLDP (an activation of the backup path might fall far below the 50 ms convergence limit of fast reroute). As another advantage, an implementation of the proposed mechanism in the data plane might be rather simple by just removing some blocking, if a special packet was received.

Those techniques that react to the failure mainly after it happens, without excessive preparations, are often called "restoration techniques" (classic PIM handles failure by waiting for the IGP to learn the new topology, then building up the tree on the new topology). Thereto, according to an embodiment, after the failure, instead of activating pre-built tree parts, the nodes detecting the failure may send tree building packets (PIM, mLDP) on the backup tree portions, exactly to the same alternative next-hops as to they would send the activation packets. Thus, instead of an activation packet, now tree join packets get take care of failure handling. Another aspect is that this solution would not require ALTERNATE JOIN messages, as the failure reaction uses regular join packets. Compared to the above-described embodiments dedicated to protection techniques, the advantage is that this does not require any data plane modification. (However join packets of PIM or mLDP are typically processed in the control plane, typically requiring more time than data plane processing.)

The invention claimed is:

1. A method performed in a unicast or multicast streaming network comprising a plurality of nodes that are interconnected by communication links and wherein data traffic is transmitted over the communication links to provide a data stream to one or more nodes of the plurality of nodes, the method comprising:
   detecting, by a first node in a multicast tree, a data traffic interruption with respect to a second node in the multicast tree;
   determining, by the first node, whether the data traffic is still received;
   performing, by the first node, one of the following conditional steps responsive to said determining:
      if the first node receives the data traffic, forwarding the data traffic to the second node, and
      otherwise sending a failure notification to a third node of the plurality of nodes about the data traffic interruption, wherein the third node is not a part of the multicast tree; and
   selecting, by the third node, at least two nodes of the plurality of nodes to be used as alternate nodes to be connected to, for providing an alternate connection for forwarding the data traffic to the first node via at least one of the alternate nodes, in case of receiving the failure notification.

2. The method of claim 1, wherein detecting, by the first node, the data traffic interruption comprises receiving the failure notification from the second node, wherein this failure notification is indicative of the data traffic interruption.

3. The method of claim 2, wherein the first node keeps stored information that the third node is to be connected to in case of receiving the failure notification.

4. The method of claim 1, wherein sending, by the first node, the failure notification to the third node about the data traffic interruption comprises forwarding the failure notification to the third node.

5. The method of claim 1, wherein the failure notification comprises a request to provide the alternate connection to the first node to be used for forwarding the data traffic.

6. The method of claim 5, wherein the failure notification comprises one of:
   a data packet to be processed at the data plane of the third node, and
   a data packet to be processed at the control plane of the third node.

7. The method of claim 1, wherein the second node is a parent node with respect to the first node such that the data traffic is forwarded from the second node to the first node in a case that no interruption occurred.

8. The method of claim 1, wherein the first node is not a parent node with respect to the third node such that the data traffic is not forwarded from the first node to the third node in a case that no interruption occurred.

9. The method of claim 1, wherein determining whether the first node still receives the data traffic comprises detecting a loss of voltage or loss of signal of the corresponding connection, or a detection by means of a bidirectional forwarding detection.

10. The method of claim 1, wherein the third node is neither a successor node nor an ancestor node of the first node.

11. The method of claim 1, wherein each of the plurality of nodes stores complete topology information of the unicast or multicast streaming network.

12. The method of claim 1, wherein the alternate nodes include a primary node and a secondary node, the primary node being a node in the multicast tree.

13. The method of claim 12, further comprising:
   forwarding, by the third node, the failure notification to the primary node when the primary node is available such that the alternate connection is provided for forwarding the data traffic to the first node via the primary node; and
   forwarding, by the third node, the failure notification to the secondary node when the primary node is unavailable, wherein the secondary node further selects at least two nodes of the plurality of nodes to be used as alternate nodes to be connected to, for providing the alternate connection for forwarding the data traffic to the first node via at least one of the alternate nodes, in case of receiving the failure notification by the secondary node.

14. A unicast or multicast streaming network comprising a plurality of nodes that are interconnected with each other by communication links, so that data traffic is provided from a source node to one or more of the plurality of nodes, the unicast or multicast streaming network comprising:
   a first node, in a multicast tree, comprising a first processor adapted for determining, after detecting a loss of data connection with respect to a second node in the multicast tree, whether the first node is still receiving the data traffic, and
      for preparing one of the following conditional steps as a result of this detection:
         if the first node is still receiving the data traffic, forwarding the data traffic to the second node, and
         otherwise sending a failure notification to a third node of the plurality of nodes;
   the third node, not a part of the multicast tree, comprising a second processor adapted for selecting at least two nodes of the plurality of nodes to be used as alternate nodes to be connected to, for providing an alternate connection for forwarding the data traffic to the first node via at least one of the alternate nodes, in case of receiving the failure notification.

15. The unicast or multicast streaming network of claim 14, wherein the first node further comprises a receiver for receiving the failure notification from the second node, wherein the failure notification is indicative of the loss of data connection.

16. A unicast or multicast streaming network comprising a plurality of network nodes being interconnected with each other by communication links, wherein data traffic is provided over the communication links to provide the data traffic to one or more of the plurality of network nodes, the plurality of network nodes comprising a first node, a second node, and a third node, wherein:
   the second node, in a multicast tree, is configured to send a failure notification indicative of a loss of data connection to the first node,
   the first node, in the multicast tree, is configured to receive the failure notification from the second node, and to forward, after detecting that the second node is the parent of the first node, the failure notification to the third node, wherein the third node is not a part of the multicast tree, and
   the third node is configured to select at least two nodes of the plurality of network nodes to be used as alternate nodes to be connected to, for providing an alternate connection for forwarding the data traffic to the first node via at least one of the alternate nodes, in case of receiving the failure notification.

* * * * *